June 5, 1934.    A. Y. DODGE ET AL    1,961,553
LUBRICATING DEVICE
Filed Nov. 21, 1932
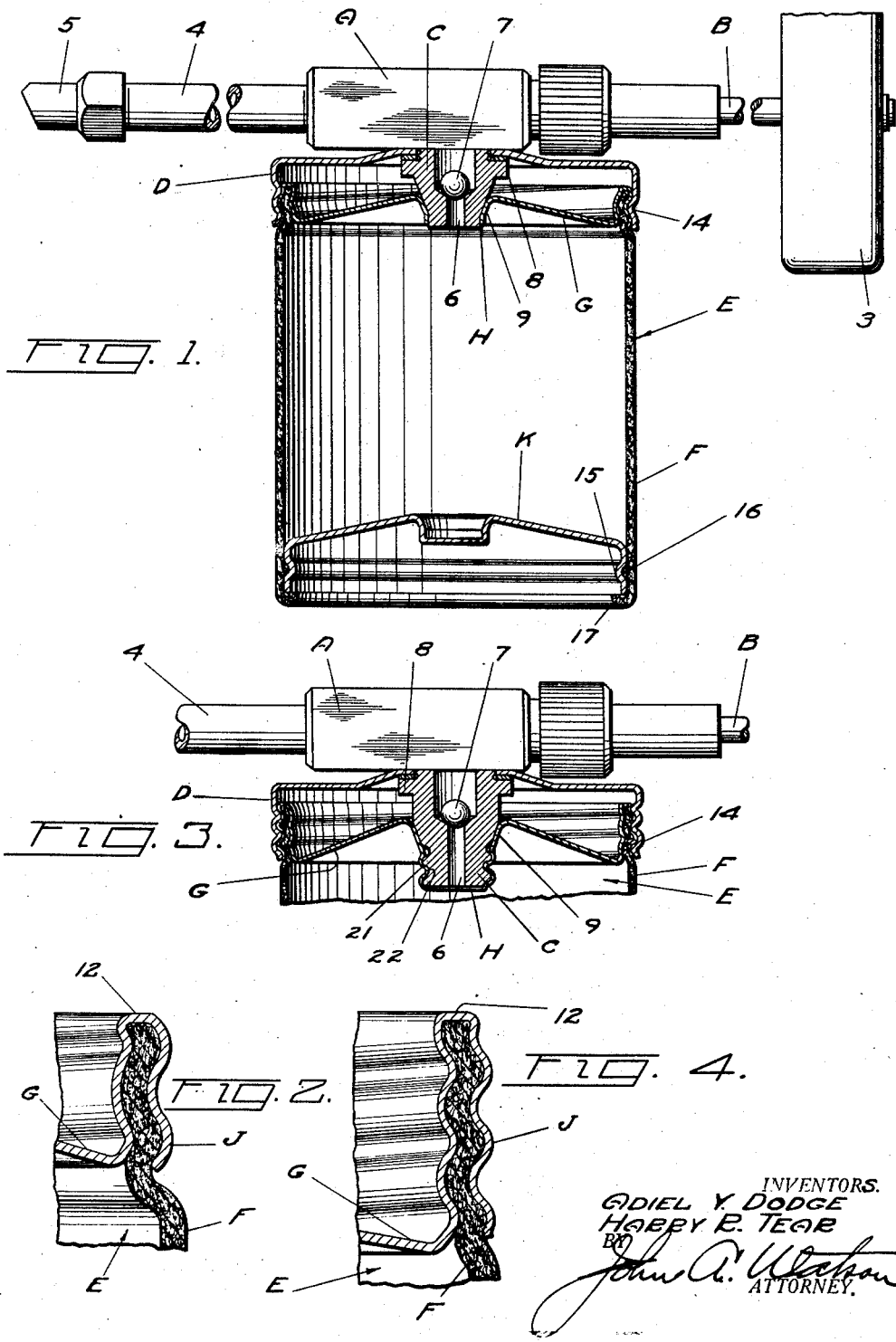
INVENTORS.
ADIEL Y. DODGE
HARRY R. TEAR
BY
ATTORNEY.

Patented June 5, 1934

1,961,553

UNITED STATES PATENT OFFICE 1,961,553

LUBRICATING DEVICE

Adiel Y. Dodge and Harry R. Tear, South Bend, Ind., assignors to The Lubrication Corporation, South Bend, Ind., a corporation of Delaware Application November 21, 1932, Serial No. 643,686

13 Claims. (Cl. 221—47.4)

This invention relates to improvements in lubricating devices and more particularly to lubricant cartridges for use with lubricant guns and similar lubricant feeding apparatus.

An object of the invention is to provide a lubricant cartridge constructed partially of cardboard or heavy paper thereby reducing the weight and the cost of the cartridge to the advantage of the purchaser.

Another object is to provide a lubricant cartridge as described wherein the structure provided for securing the metal cartridge head or end wall to its cardboard or paper side walls provides also means for securing the cartridge upon the gun and for creating thrust between the cartridge outlet and gun inlet connecting members.

A further object is to provide a cartridge, for a lubricant gun, constructed of a plurality of mechanically joined parts wherein pressure is applied to the joint between the parts as a function of the mechanism for supporting the cartridge upon the gun.

A further object is to provide a lubricant cartridge for detachable support upon a lubricant gun wherein the relatively fragile cardboard or paper side walls are free of all stresses or strains resulting from the mechanical and lubricant interconnection between cartridge and gun.

Other objects, the advantages and uses of the invention will be or should be apparent after a reading of the following description and claims and after considering the accompanying drawing, in which:

Fig. 1 is a side elevation, partly in section, of a hand lubricant gun equipped with a lubricant cartridge constructed in accordance with the invention;

Fig. 2 is an enlarged fragmentary sectional view of the side wall and head joint of the cartridge of Fig. 1;

Fig. 3 is a fragmentary view of a modified form of the cartridge installed upon a hand lubricant gun; and Fig. 4 is a view similar to Fig. 2 of the cartridge of Fig. 3.

In general, the apparatus selected for illustration herein comprises, a hand gun having a cylinder A, a manually operable piston B for the cylinder A, a cartridge connector stud C, a cartridge connector or supporting plate D, and a cartridge E having cardboard or paper side walls F, a metal head plate G provided with an outlet opening H, the walls of which are engageable with the stud C, rolled threads J on the head plate D engageable with the connector plate D and a metal cartridge piston or follower K.

Referring particularly to Figs. 1 and 2, the hand lubricant gun illustrated therein includes a hand grip 3 upon the end of the piston B to facilitate manual operation thereof. A rigid conduit 4 connected to the cylinder A serves to conduct lubricant to and to support a discharge nozzle 5 through which lubricant from the gun may be discharged into a lubricant receiving fitting. The cartridge connector stud C has a passage 6 therethrough within which a check valve 7 may be located to prevent return of lubricant from the cylinder A to the cartridge E. A flange 8, hexagonal in shape for engagement with the jaws of a wrench, is formed on the outer wall of the stud C, between which and the wall of the cylinder A, the connector or supporting plate D is fixed. The outer portion of the exterior wall of the stud C is tapered to conform in contour with the conical side walls 9 of the cartridge outlet opening H to provide a metal to metal seal therebetween upon relative thrust between the stud and cartridge head.

The cardboard or paper side wall F of the cartridge E may be formed of a tube of that material joined to the head plate G by interposing the upper end of the cylindrical side wall between the walls of a substantially U shaped extension 12 at the periphery of the head plate G, and subsequently forming the rolled thread J under pressure in the said extension to clamp the upper end of the side wall tightly between the walls of the extension 12 and thus form a lubricant tight seal therebetween.

The operation thus described, as may be seen, is one of double function, that of fixing the head to the side walls and that of providing the threads J for engagement with complementary threads 14 formed in the connector plate D for supporting the cartridge detachably upon the gun and for creating relative thrust between the stud C and wall portion 9 of the cartridge outlet opening H.

The piston or follower K of the cartridge is of such contour as to follow the shape of the rearward face of the cartridge head G to enable complete discharge of lubricant from the cartridge under piston or follower influence. A rearwardly extending skirt 15 is formed on the piston K to prevent the piston from becoming cocked in its travel along the cylinder F and to provide support for sealing means, such as a cotton packing ring 16. If desired, the lower end of the cylindrical side wall F may be rolled inwardly as shown at 17 to prevent the piston K from becoming dislodged from within the cartridge. Aside from carrying out its function as a follower under atmospheric pressure the piston or follower K because of its metal construction serves to iron out slight irregularities in the side walls of the cartridge as it progresses therealong, thus maintaining fluid tight seal therewith.

It will be noted that the head plate G is dished outwardly, a feature which goes to augment the maintenance of constant relative thrust between the stud C and wall 9 of the cartridge outlet because of the inherent slight flexibility of such structure. During shipment and storage prior to use a cap or plug may be fitted within the cartridge outlet H to prevent the leakage of lubricant therethrough.

In operation the cartridge is secured to the gun by turning the cartridge bodily to cause the threads J to engage with the threads 14 of the connector plate D, thus drawing the wall portion 9 of the outlet H into engagement tightly with the tapered side wall of the stud C to obtain a lubricant tight seal therebetween. Further turning of the cartridge may result in placing the dished wall of the cartridge head plate under slight compression, thus augmenting the thrust maintained between the stud C and cartridge outlet wall.

The cartridge thus described possesses the feature of the absence of all strain upon the relatively fragile cardboard or paper wall F and in addition, the utmost simplicity in construction and consequently low manufacturing cost.

In Figs. 3 and 4 another form of the cartridge is shown wherein the wall of the cartridge outlet opening below the conical portion 9 is formed with a rolled thread 21 engageable with a coarse thread 22 formed on the lower end of the stud C. In this form of the cartridge the threaded portion J of the extension 12 is elongated so as to allow full play in securing the threads 21 and 22 in engagement tightly with one another. The seal between the stud C and the cartridge outlet opening, as in the form first described, is perfected by metal to metal contact between the wall 9 of the stud and the conical wall portion of the outlet H above the threads 21.

It will be noted that in both forms of the cartridge shown that the head plate G is dished outwardly and that the joint between the head plate and the side wall E, with the cartridge in place upon the gun, is in such a position as to be compressed when thrust is applied to the head plate to depress the dished portion thereof tending to cause expansion radially.

It is to be understood that the embodiments of the invention herein set forth are presented for the purpose of illustration only, and various changes may be made therein without departing from the spirit and scope of the appended claims.

We claim:

1. A lubricant cartridge for use with a lubricant feeding device including an inlet port, comprising a metallic head plate having an outlet opening for registration with said inlet port, fibrous side walls, a joint between said head plate and said side walls for establishing a lubricant tight seal therebetween, and means for detachably supporting said cartridge upon said feeding device and for simultaneously compressing said joint to augment the lubricant tight seal formed thereby.

2. A lubricant cartridge for use with a lubricant feeding device including an inlet port, comprising a metallic head plate having an outlet opening for registration with said inlet port, non-metallic and non-rigid side walls, a joint between said head plate and said side walls for establishing a lubricant tight seal therebetween, and means for detachably supporting said cartridge upon said feeding device and for simultaneously compressing said joint to augment the lubricant tight seal formed thereby.

3. A lubricant cartridge for use with a lubricant feeding device including an externally threaded inlet stud and a threaded cartridge connector plate, comprising a hollow cylindrical body having an outlet in one end, the walls of which are threaded for engagement with said threaded inlet stud, said body being further provided with threads engageable with said connector plate, the pitch of the threads on said outlet wall and of the threads engageable with the connector plate being the same.

4. A lubricant cartridge for use with a lubricant feeding device including an externally threaded inlet stud and a threaded cartridge connector plate, comprising a hollow cylindrical body having an outlet in one end, the walls of which are threaded for engagement with said threaded inlet stud, said body being further provided with threads engageable with said connector plate, the threads on said outlet wall and on said body engageable with said connector plate being concentric and of similar pitch.

5. A lubricant cartridge comprising a metal head plate and side walls of fibrous material joined to said head plate, the joint between said head plate and said side walls being fashioned to provide screw threads, said head plate having a central outlet opening therethrough, the walls of which are threaded at a pitch corresponding to the pitch of the threads at said joint.

6. A lubricant cartridge comprising a metal head plate, side walls of fibrous material joined to said head plate, and a metal piston slidably mounted within said side walls providing a closure for the opposite end of said cartridge, said head plate being dished outwardly and having an outlet opening therethrough, said joint between said head plate and said side walls being such as to become compressed upon the application of pressure to said dished head in a direction inwardly of the head plate.

7. A lubricant cartridge for use with a lubricant feeding device including an inlet port, comprising a metallic circular head plate having its peripheral portion bent forwardly and rearwardly to provide a cylindrical wall portion having a U shaped cross section, and a fibrous cylindrical side wall for the cartridge, one end of which is inserted between the opposed walls of the U shaped wall portion of said head plate, said U shaped wall portion being formed with rolled threads, thereby providing a mechanically strong lubricant tight joint between said head plate and said fibrous side walls.

8. A lubricant cartridge for use with a lubricant feeding device including a lubricant inlet stud and a threaded cartridge connector plate, comprising a metal head plate formed with an aperture therethrough, the side walls of which are formed for sealing engagement, under thrust, with said inlet stud, a non-rigid and non-metallic side wall for said cartridge, means for securing said side walls to said head plate including parallel lateral wall portions formed on said head plate, one end of said non-metallic side wall being inserted between said wall portions, and a rolled thread in said lateral wall portions and interposed cartridge side wall, said thread being engageable with said threaded connector plate to support the cartridge upon the feeding device.

9. A lubricant cartridge for use with a lubricant feeding device, comprising a metal head plate, side walls of fibrous material joined to said head plate at the periphery thereof, said head plate being dished outwardly and formed with an outlet opening centrally therethrough, the joint between said head plate and fibrous side walls being formed so as to compress the fibrous material of the side walls when said dished head plate is depressed as by relative thrust between the cartridge head and adjacent portions of the feeding device.

10. A lubricant cartridge for use with a lubricant feeding device, comprising a metal head plate, side walls of fibrous material joined to said head plate at the periphery thereof, said head plate being dished outwardly and formed with an outlet opening centrally therethrough, the joint between said head plate and fibrous side walls being formed to present screw threads for supporting the cartridge upon said feeding device, said joint being further formed so as to compress the fibrous material of the side walls when said dished head plate is depressed as by relative thrust between the cartridge head and adjacent portions of the feeding device.

11. A lubricant cartridge for use with a lubricant feeding device having an internally threaded connector plate, comprising, a sheet metal head plate formed at its periphery to provide annular and opposed wall portions concentric with the axis of the plate, a non-metallic cylinder of compressible substance having one end inserted between said opposed wall portions, said head plate being further formed with screw-threads in at least the outermost of said wall portions for engagement with said threaded connector plate whereby the outer of said wall portions when threadedly engaged with the plate will be urged toward the innermost of said wall portions to compress the interposed end of said non-metallic cylinder.

12. A lubricant cartridge for use with a lubricant feeding device comprising a circular metal head plate having an outlet opening therethrough, a cylindrical side wall of compressible material, said side wall being joined to the periphery of said head plate by a seam wherein at least a portion of the side wall contacting the head is compressed, and means located on said seam for detachably securing said cartridge to said feeding device.

13. A lubricant cartridge for use with a lubricant feeding device comprising, a circular metal head plate having an outlet opening therethrough, a cylindrical side wall of compressible material, said side wall being joined to the periphery of said head plate by a seam wherein at least a portion of the side wall contacting the head is compressed, and screw threads formed in a portion of said seam for detachably securing said cartridge to said feeding device.

ADIEL Y. DODGE.
HARRY R. TEAR.